United States Patent
Büsch et al.

(10) Patent No.: US 9,258,980 B2
(45) Date of Patent: Feb. 16, 2016

(54) FASTENING ANCHOR, FASTENING ANCHOR BAND, AND SETTING TOOL

(75) Inventors: Martin Büsch, Efringen-Kirchen (DE);
Patrice Burg, Steinbrunn-le-Bas (FR);
Ronnie Weissenfeld, Weil am Rhein (DE); Sven Bokühn, Wehr (DE)

(73) Assignee: A. Raymond et Cie, Grenoble (FR)

( * ) Notice: Subject to any disclaimer, the term of this patent is extended or adjusted under 35 U.S.C. 154(b) by 863 days.

(21) Appl. No.: 13/510,208

(22) PCT Filed: Nov. 2, 2010

(86) PCT No.: PCT/EP2010/066628
§ 371 (c)(1),
(2), (4) Date: Jun. 7, 2012

(87) PCT Pub. No.: WO2011/061052
PCT Pub. Date: May 26, 2011

(65) Prior Publication Data
US 2012/0241490 A1    Sep. 27, 2012

(30) Foreign Application Priority Data
Nov. 19, 2009   (DE) .................. 10 2009 054 005

(51) Int. Cl.
*B27F 7/00* (2006.01)
*B25C 7/00* (2006.01)
*F16B 19/04* (2006.01)
*A01K 11/00* (2006.01)

(52) U.S. Cl.
CPC ............ *A01K 11/002* (2013.01); *A01K 11/001* (2013.01)

(58) Field of Classification Search
CPC .... B25B 31/00; A01K 11/001; A01K 11/002; B21J 15/26; B21J 15/041; B21J 15/32; B21J 15/323; B65C 7/001; B65C 7/005; B65C 7/006; A41H 37/005
USPC .................................... 227/76; 411/500–510
See application file for complete search history.

(56) References Cited

U.S. PATENT DOCUMENTS

| 4,120,303 A * | 10/1978 | Villa-Massone et al. ...... 606/117 |
| 4,195,635 A * | 4/1980 | Ritchey .......................... 606/117 |
| 4,250,643 A * | 2/1981 | Mackenzie ..................... 40/301 |
| 5,234,440 A * | 8/1993 | Cohr ............................. 606/117 |

(Continued)

FOREIGN PATENT DOCUMENTS

| DE | 19726467 A1 | 12/1998 |
| DE | 19939277 A1 | 2/2001 |

(Continued)

OTHER PUBLICATIONS

International Search Report and Written Opinion mailed Mar. 8, 2012 in parent International Application No. PCT/EP2010/066628 (including the cover letter requesting International Examination and the English translation thereof).

*Primary Examiner* — Andrew M Tecco
(74) *Attorney, Agent, or Firm* — Faegre Baker Daniels LLP

(57) ABSTRACT

A setting tool having an engagement structure for setting a fastening anchor comprising a receptacle structure implemented in a shaft, the engagement structure engaging with the receptacle structure during a setting procedure. The fastening anchor can thereby be reliably brought to the setting tool and applied in a yielding soft material.

7 Claims, 18 Drawing Sheets

(56) References Cited

U.S. PATENT DOCUMENTS

| | | | | |
|---|---|---|---|---|
| 6,053,926 | A * | 4/2000 | Luehrs et al. | 606/117 |
| 8,061,574 | B2 * | 11/2011 | Lesser et al. | 227/131 |
| 8,241,300 | B2 * | 8/2012 | Lynd et al. | 606/117 |
| 8,398,652 | B2 * | 3/2013 | Ritchey et al. | 606/117 |
| 8,486,088 | B2 * | 7/2013 | Ritchey et al. | 606/117 |
| 2004/0092954 | A1 * | 5/2004 | Eadie | 606/117 |
| 2010/0064985 | A1 * | 3/2010 | Jacobsen et al. | 119/858 |
| 2011/0152876 | A1 * | 6/2011 | Vandeputte | 606/116 |

FOREIGN PATENT DOCUMENTS

| | | |
|---|---|---|
| DE | 10223470 A1 | 12/2003 |
| FR | 2929804 A1 | 10/2009 |
| GB | 2023510 A | 1/1980 |
| WO | WO 2007057066 A1 * | 5/2007 |
| WO | WO2007/098512 A1 | 9/2007 |
| WO | WO 2009127541 A1 * | 10/2009 |

* cited by examiner

US 9,258,980 B2

FASTENING ANCHOR, FASTENING ANCHOR BAND, AND SETTING TOOL

CROSS-REFERENCE TO RELATED APPLICATION

This application is a U.S. National Phase Patent Application based on International Application No. PCT/EP2010/066628 filed Nov. 2, 2010, the entire disclosure of which is hereby explicitly incorporated by reference herein.

BACKGROUND OF THE INVENTION

1. Field of the Invention

The present invention relates to a fastening anchor belt and setting tool.

2. Description of the Related Art

One known fastening anchor is disclosed in GB 2 023 510 A. That document discloses a fastening anchor operative to anchor in a soft, yielding material in the form of an animal ear and comprising a cover plate, an elongate shank formed on the cover plate and extending away therefrom, and a barb arrangement formed at the end of the shank directed away from the cover plate. Formed in the cover plate is a receiving structure in the form of two openings, which are disposed one on each side of the shank and through which two pins of a setting tool pass during the application of a fastening anchor, and which abut a transverse stop formed by the barb arrangement at the end of the shank directed away from the cover plate.

The setting tool disclosed in the aforesaid document has a push bar that carries the pins and that can be actuated, against the spring force of a compression spring, by means of a toggle lever.

SUMMARY OF THE INVENTION

The present invention provides a fastening anchor that can be applied in a soft, yielding material even under rugged working conditions, as well as a fastening anchor belt and a setting tool, which in combination with the fastening anchors permit fast and reliable application of the fastening anchors in a soft, yielding material.

By virtue of the integration of the receiving structure into the shank of the fastening anchor, the fastening anchor can be grasped and applied with the ability to withstand forces acting from different directions.

The magazining of fastening anchors according to the invention in the form of a fastening anchor belt according to the invention results in a high rate of application, particularly in combination with a setting tool according to the invention.

Configuring the setting tool according to the invention with an engaging structure adapted to engage with the receiving structure formed on the shank of a fastening anchor results in reliable application of the fastening anchors even under harsh working conditions.

In one form thereof, the present invention provides a fastening anchor for anchoring in a soft, yielding material, including a cover plate, an elongate shank formed on the cover plate and extending away therefrom, and a barb arrangement formed on the end of the shank directed away from the cover plate, the shank including a receiving structure adapted for surrounding engagement with an engaging structure of a setting tool, and the receiving structure including a receiving space which extends in the longitudinal direction of the shank and into which an insertion pin of the setting tool can be inserted and which is terminated by a tip forming a cross stop, characterized in that the receiving space is delimited by two mutually facing shank cheeks connected to each other by a number of cross struts and it being the case that the shank cheeks and the cross struts form the receiving space.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
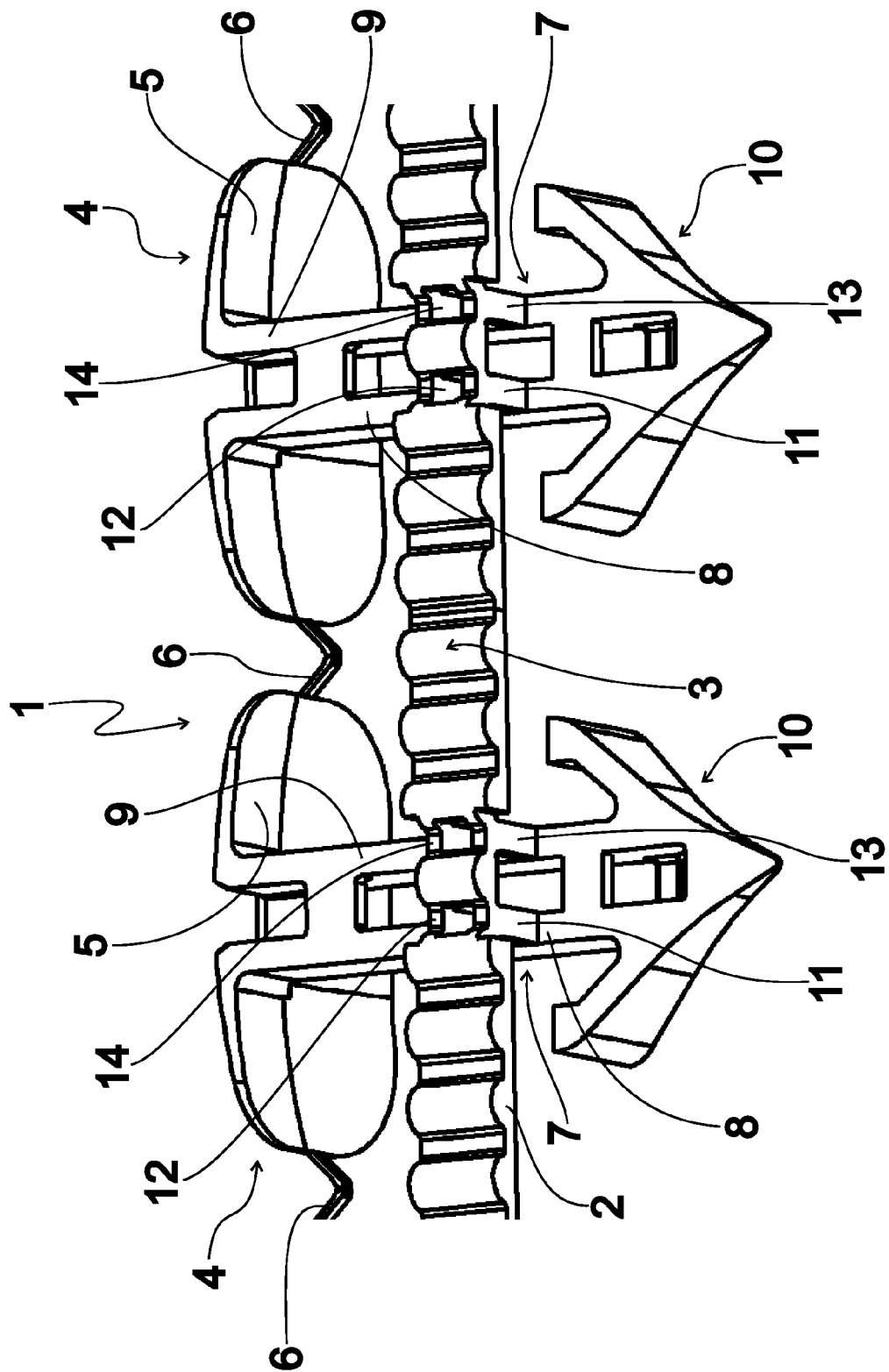
FIG. 1 is a perspective view of a detail of an exemplary embodiment for a fastening anchor belt according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of a detail of an exemplary embodiment of a fastening anchor belt 1 according to the invention, made of a hard-elastic synthetic material. The fastening anchor belt 1 comprises a conveyor belt 2 configured with a tooth structure 3 formed of evenly disposed elevations and depressions. The fastening anchor belt 1 according to FIG. 1 is also provided with a number of fastening anchors 4, two of which are shown in the representation of FIG. 1. Each fastening anchor 4 is configured with a flat cover plate 5, and these are connected to each other via cover plate tie webs 6 extending between the cover plates 5 of adjacent fastening anchors 4. Formed on the cover plate 5 of each fastening anchor 4 are two mutually facing shank cheeks 8, 9, which form a shank 7 and are configured at their ends directed away from the cover plate 5 with a barb arrangement 10. In this exemplary embodiment, each fastening anchor 4 is connected to the conveyor belt 2 via a respective two shank tie webs 11, 12, 13, 14 joined to each respective shank cheek 8, 9.

It is understood that in embodiments not shown, other means of attaching fastening anchors 4 to a conveyor belt 2, or even to two or more conveyor belts 2, can be provided, for example such means disposed at right angles to the arrangement of FIG. 1 or having a different number of shank tie webs 11, 12, 13, 14.

Figure 2:
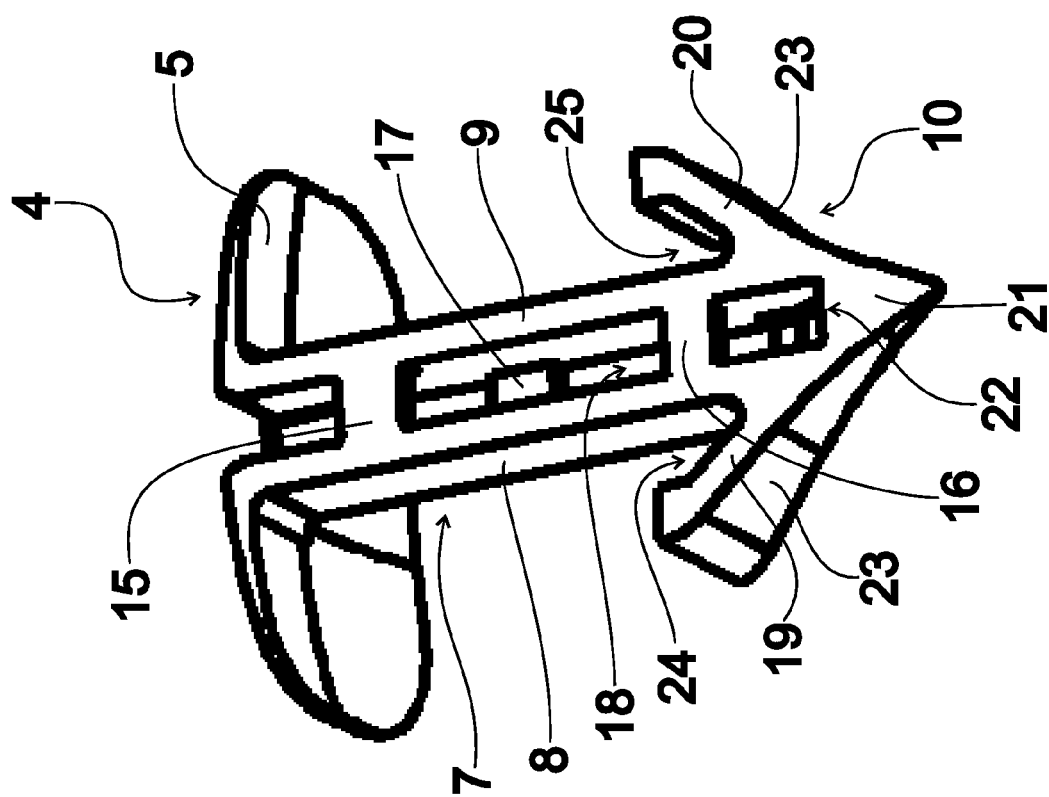
FIG. 2 is a perspective view of an exemplary embodiment of a fastening anchor according to the invention particularly for use with a fastening anchor belt according to FIG. 1.

FIG. 2 shows an exemplary embodiment of a fastening anchor 4 according to the invention of the kind used in particular with the exemplary embodiment of a fastening anchor belt 1 according to the invention depicted in FIG. 1, but which can also be present in bulk form. It can be seen from FIG. 2 that extending between the shank cheeks 8, 9 are a number of cross struts 15, 16, 17, of which at least one cross strut 17 is formed on a side of the shank cheeks 8, 9 facing away from the viewer in the representation of FIG. 2 and at least two cross struts 15, 16 are formed on the other side of the shank cheeks 8, 9, i.e., the side facing toward the viewer in the representation of FIG. 2. The shank cheeks 8, 9 and the cross struts 15, 16, 17 thus surround a receiving space 18 forming a receiving structure.

It is also apparent from FIG. 2 that the cover plate 5 extends radially outward from only three sides of the shank 7 and joins flush with the fourth side of the shank 7, i.e., the side facing the viewer in the representation of FIG. 2.

In a modification not shown, the cover plate 5 projects radially beyond all sides of the shank 7.

In the exemplary embodiment of a fastening anchor 4 according to the invention depicted in FIG. 2, the barb arrangement 10 comprises two hook cheeks 19, 20, which protrude laterally from the shank 7 and extend toward the cover plate 5 from a tip 21 disposed in prolongation of the shank 7. The tip 21 thus forms, by its side facing the cover plate 5, a transverse stop 22 for the receiving space 18. Each hook cheek 19, 20 is provided with an outwardly curved oblique side 23, which extends from the tip 21 toward the cover plate 5 initially at a relatively low angle of incidence to the longitudinal axis, and then at an angle of incidence that increases radially outward with increasing distance from the tip 21, and ultimately terminates in substantially parallel alignment with the shank 7 in the end region remote from the tip 21. Formed between the end of each hook cheek 19, 20 directed away from the tip 21 and the respective facing shank cheek 8, 9 is a respective rear engagement recess 24, 25 provided to create a high anchoring effect.

Figure 3:
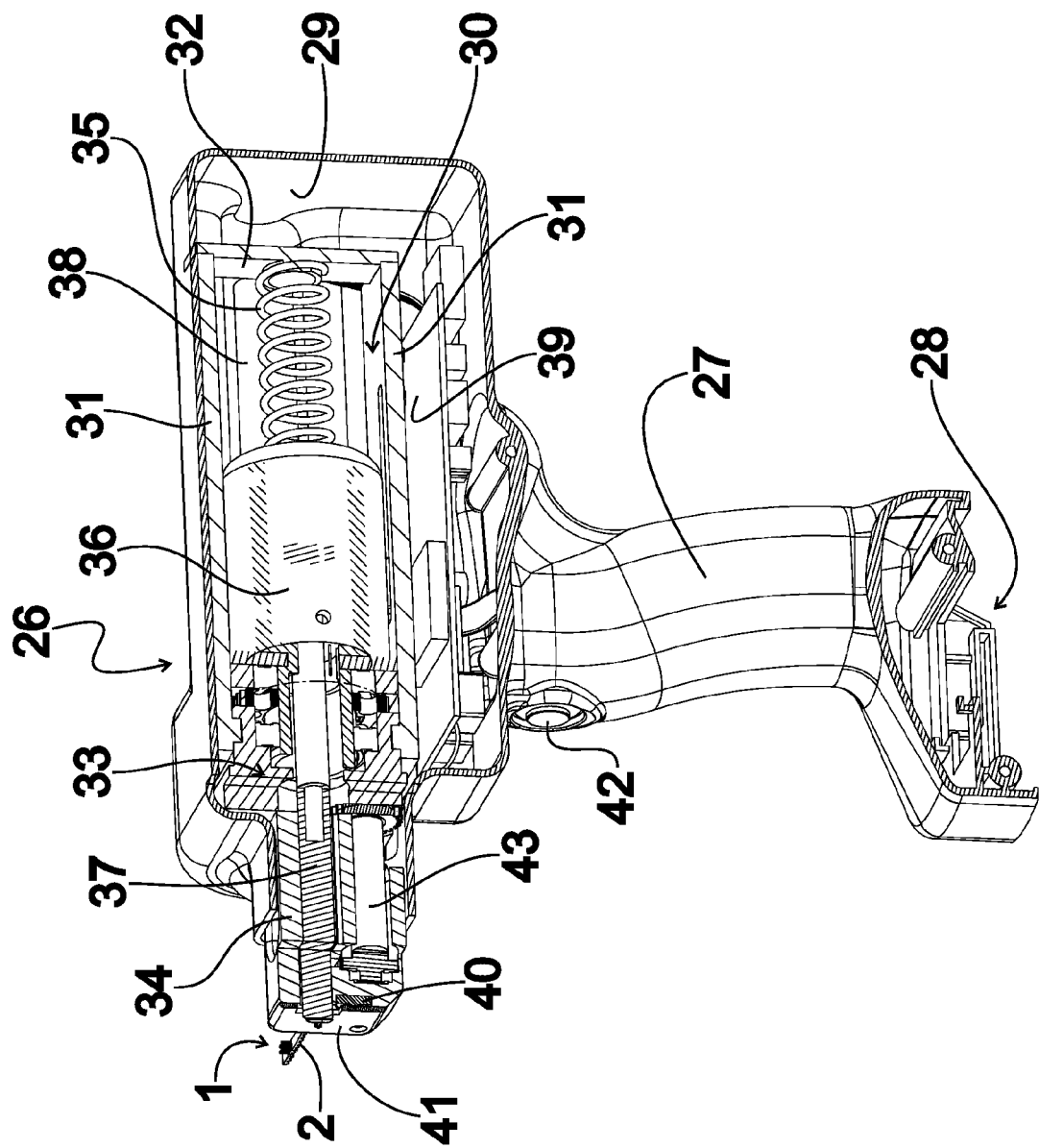
FIG. 3 is a partially cut-away perspective view of an exemplary embodiment of a setting tool according to the invention, which is motor-driven and is adapted for use with a fastening anchor belt according to FIG. 1.

FIG. 3 is a partially cut-away perspective view of an exemplary embodiment of a motor-driven setting tool 26 according to the invention for setting fastening anchors 4 (not illustrated in FIG. 3) magazined on a fastening anchor belt 1 equipped with a conveyor belt 2 according to FIG. 1. The setting tool 26 according to FIG. 3 is implemented as pistol-like and comprises a grip 27, at the free end of which is formed a battery compartment 28 in which a battery (not shown in FIG. 3) for supplying electrical energy can be replaceably secured. Formed on the grip 27 at the opposite end from the battery compartment 28 is an essentially rectangular shaped receiving housing 29, the long side of which extends transversely to the grip 27.

Fixedly disposed in the receiving housing 29 is a machine element frame 30 composed of two parallel, mutually facing longitudinal bearing plates 31 extending in the longitudinal direction of the receiving housing 29, an abutment plate 32 disposed at an end of the longitudinal bearing plates 31 directed away from the grip 27, a head bearing part 33 disposed opposite the abutment plate 32, and a shank bearing part 34 disposed on the opposite side of head bearing part 33 from the longitudinal plates 31.

Disposed between the longitudinal bearing plates 31 is a spirally coiled compression spring 35, which bears by one end against the abutment plate 32 and by the other end against a displacement link 36 mounted between the longitudinal bearing plates 31 displaceably in the longitudinal direction thereof. Fixedly coupled to the displacement link 36 is a push bar 37 that extends into the shank bearing part 34.

Also disposed in the receiving housing 29 are a drive motor 38 and a control electronics 39, by means of which, in cooperation with a force sensor 40 disposed in shank bearing part 34 behind a faceplate 41 located in the region of the free end of push bar 37 and a trigger button 42 disposed in the grip 27, to effect the motor-driven setting of fastening anchors 4, as described in more detail hereinbelow, in conjunction with a conveyor belt feed shaft 43 coupled to the drive motor 38.

Figure 4:
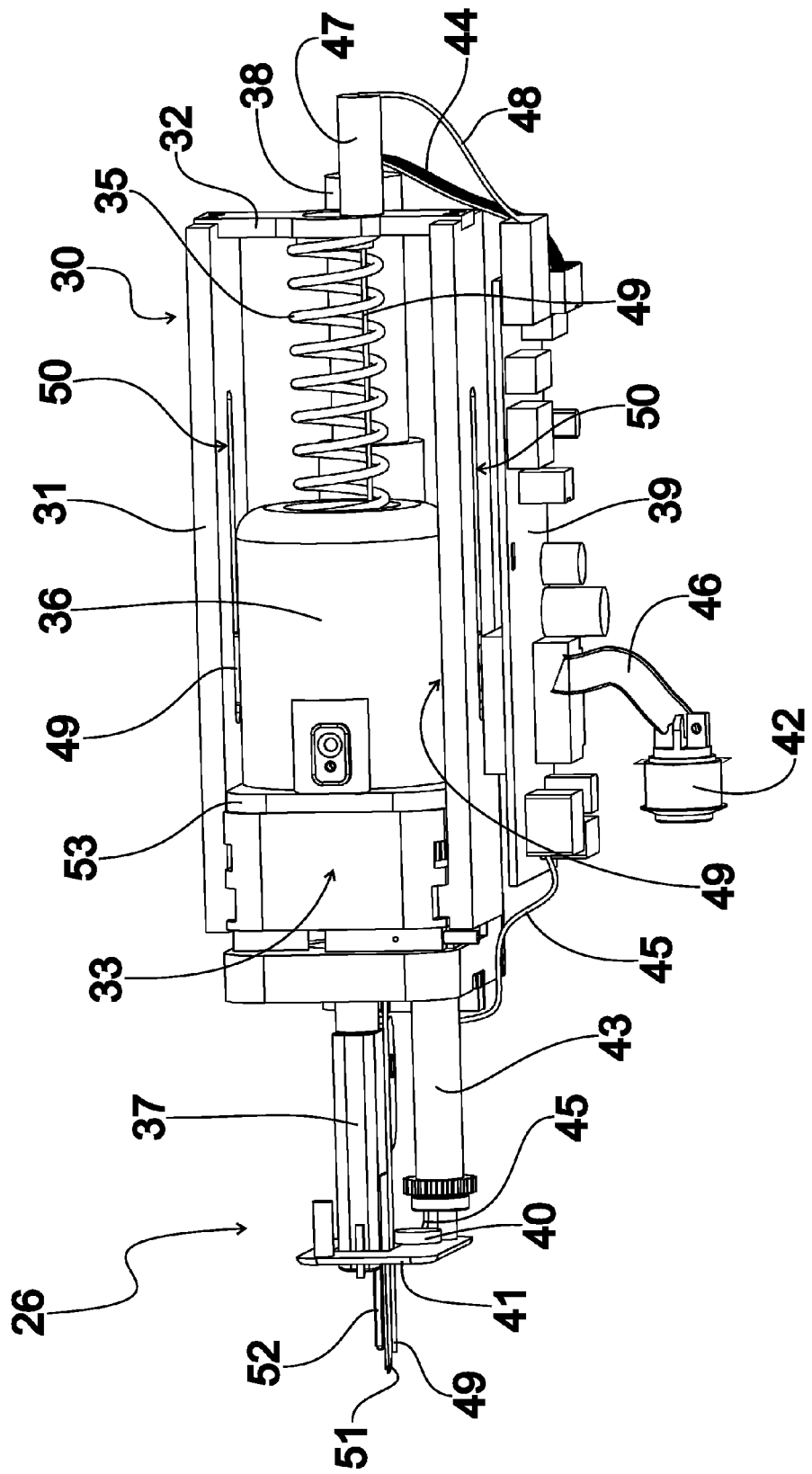
FIG. 4 is a perspective view of a machine element frame, with attachments, in the case of the exemplary embodiment according to FIG. 3.

FIG. 4 is a perspective view of the machine element frame 30 of the exemplary embodiment of a motor-driven setting tool 26 according to FIG. 3. It can be seen from FIG. 4 that the drive motor 38, the force sensor 40 and the trigger button 42 are each connected to the control electronics 39 via an electrical wiring system 44, 45, 46. It can also be understood from the representation of FIG. 4 that the motor-driven setting tool 26, in the exemplary embodiment illustrated, includes a laser 47 preferably emitting in the visible region of the spectrum, mounted to the abutment plate 32 and also connected to the control electronics 39 via an electrical wiring system 48. The laser beam 49 that can be generated with the laser 47 passes through the machine element frame 30 and the faceplate 41, and can therefore serve as an application reference for positioning the tip 21 during the application of fastening anchors 4 (not shown in FIG. 4).

It can also be seen from the representation of FIG. 4 that the displacement link 36 is mounted displaceably and non-rotatably by means of guide bases 49 arranged diametrically opposite each other and engaging in guide slots 50 provided in the longitudinal bearing plates 31.

Finally, it can be understood from the representation of FIG. 4 that mounted to the end of the push bar 37 directed away from the displacement link 36 are a piercing blade 51 and an insertion pin 52 that forms an engaging structure, which elements extend past the faceplate 41 in the arrangement of FIG. 4, in which the displacement link 36 is as far from abutment plate 32 as it can go, having come to rest against a stop plate 53 extending transversely to the longitudinal bearing plates 31. The piercing blade 51 and the insertion pin 52 are fixedly connected to each other and are mounted to the push bar 37.

Figure 5:
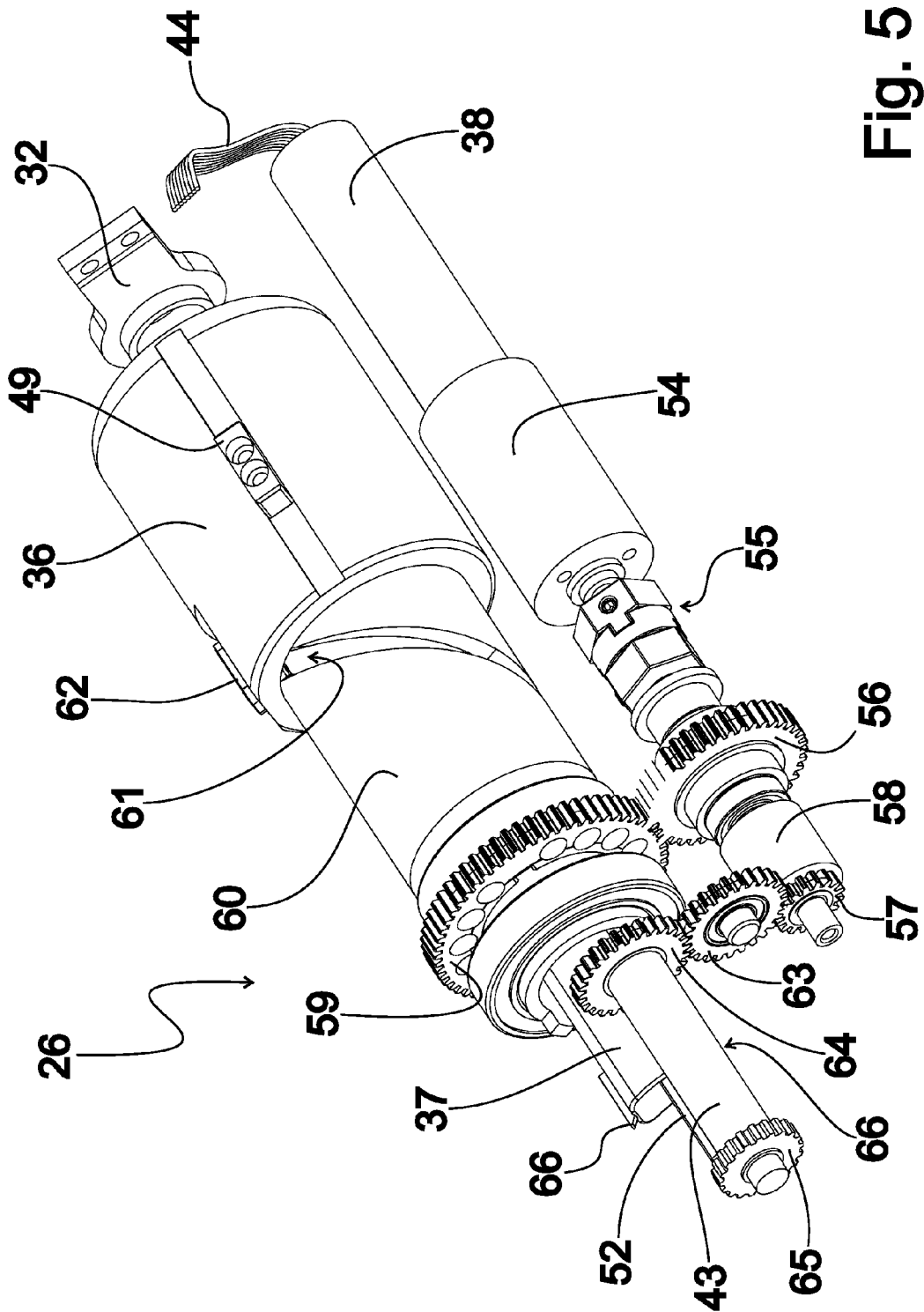
FIG. 5 is a perspective view of the interaction of a displacement link and a drive motor in the exemplary embodiment according to FIG. 3 and FIG. 4.

FIG. 5 is a perspective view of the motor-driven setting tool 26 according to FIG. 3 and FIG. 4, illustrating in particular the interaction of the displacement link 36 and the drive motor 38. The drive motor 38, which is equipped with a rotatable drive shaft (not visible in FIG. 5), is coupled to a drive transmission 54, which, via a shaft coupling 55, drives in rotation a control shaft input gear 56 and a conveyor shaft input gear 57, which are non-rotatably connected to a drive shaft 58.

The control shaft input gear 56 is engaged with a control shaft output gear 59 that is non-rotatably coupled to a control slot body 60. The control slot body 60 is configured with a control slot 61 and extends into the interior of the hollow-cylindrically configured displacement link 36, in such fashion that a slot pin 62 disposed on the displacement link 36 and projecting into the interior of the displacement link 36 engages in the control slot 61. As a result, by rotation of the output shaft 58, the displacement link 36 can be moved to execute the movement steps described more closely below, under positive control exerted via suitably adapted configurations of the control slot 61.

The conveyor shaft input gear 57 is engaged with an intermediate gear 63, which cooperates in turn with a conveyor shaft output gear 64 non-rotatably mounted to the conveyor belt feed shaft 43. The conveyor belt feed shaft 43 also carries a conveyor belt feed gear 65, which is engaged with the tooth structure 3 of the conveyor belt 2 of a fastening anchor belt 1 not shown in FIG. 5.

Disposed on the push bar 37, one on each side of the insertion pin 52, are detaching cutters 66, one of which can be seen in the representation of FIG. 5.

Figure 6:
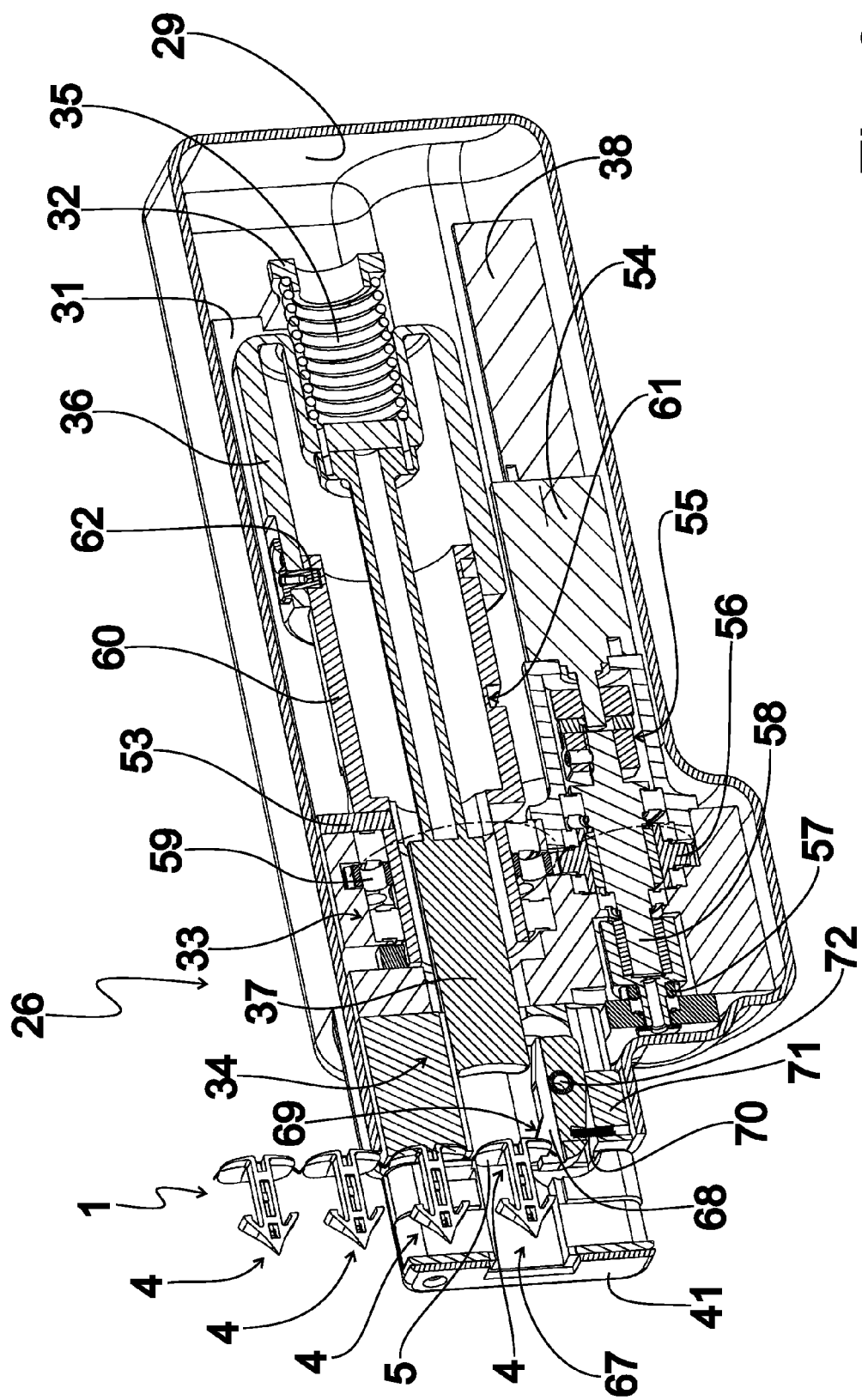
FIG. 6 is a perspective, partially cut-away view of the exemplary embodiment of a motor-driven setting tool according to the invention as depicted in FIG. 3 to FIG. 5, with a number of fastening anchors according to FIG. 2 magazined on a fastening anchor belt according to FIG. 1, at the beginning of a setting operation.

FIG. 6 is a perspective, partially cut-away view of the exemplary embodiment of a motor-driven setting tool 26 according to the invention as depicted in FIG. 3 to FIG. 5, with a number of fastening anchors 4 according to FIG. 2 magazined on a fastening anchor belt 1 according to FIG. 1, at the beginning of a setting operation. In the arrangement of FIG. 6, the displacement link 36 is arranged immediately adjacent the abutment plate 32 and the compression spring 35 is maximally compressed. A fastening anchor 4 is disposed in a discharge conduit 67 within which the push bar 37 moves, an edge face of the cover plate 5 of this fastening anchor 4 being engaged in a fixing slot provided in a fixing rocker 68. The fixing rocker 68 extends by a launching side 69 into the discharge conduit 67 and is mounted so as to swivel out of the discharge conduit 67 about a swivel axis 72 against the restoring force of a restoring pressure spring 70, which by its other end engages in a restoring abutment 71.

Figure 7:
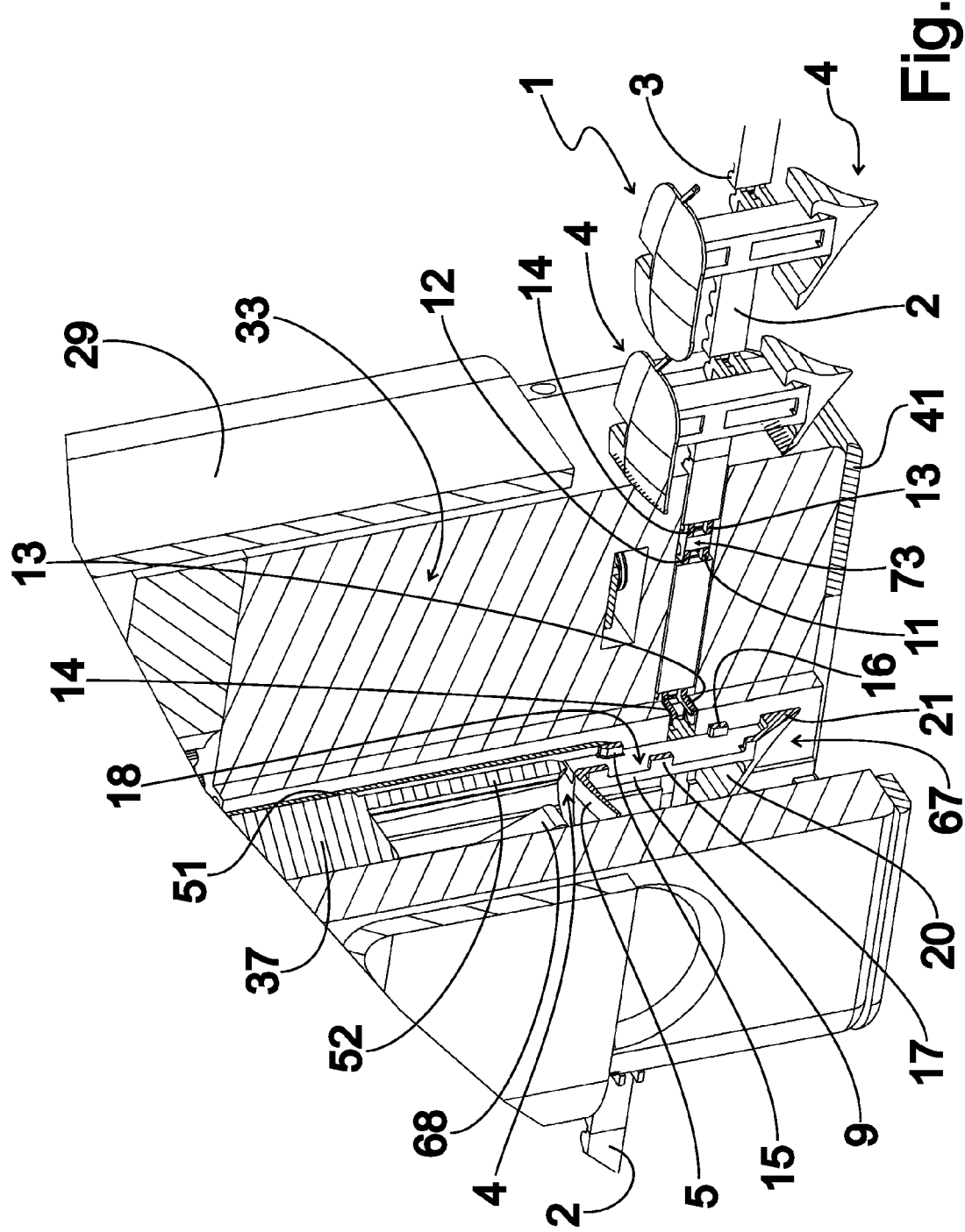
FIG. 7 is a partially cut-away partial view of the arrangement of FIG. 6 in the region of the fastening anchors.

FIG. 7 is a perspective, partially cut-away detail view of the arrangement according to FIG. 6 in the region of the fastening anchor 4 disposed in the discharge conduit 67. It is apparent from FIG. 7 that the conveyor belt 2 is disposed in a conveyor belt guide slot 73 in head bearing part 33, with the tooth structure 3 directed toward and engaged with the conveyor belt feed gear 65, which is not shown in FIG. 7. In this way, the fastening anchors 4 affixed to the conveyor belt 2 can be conveyed one after another into the discharge conduit 67 for each setting operation. At the beginning of the setting operation, as illustrated in FIG. 7, the piercing blade 51 and the insertion pin 52 are out of engagement with the shank tie webs 11, 12, 13, 14 of the fastening anchor belt 1 or the fastening anchors 4.

For the setting operation to begin, it is still necessary in this exemplary embodiment that the faceplate 41 be pressed onto a soft material with at least a predetermined pressing force received by the force sensor 40, so as to unlock the trigger button 42.

Figure 8:
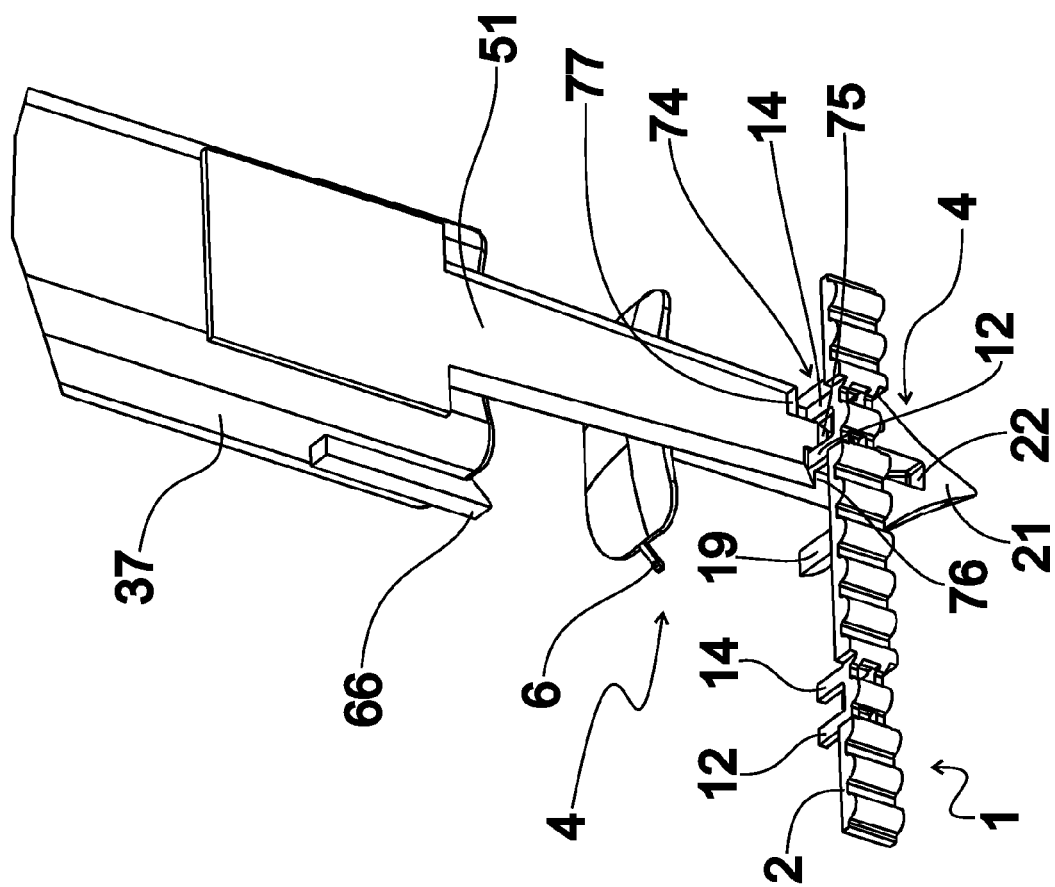
FIG. 8 is a perspective detail view of the arrangement of the fastening anchor belt and the push bar after the beginning of the setting operation, with a push bar that is advanced in comparison to the arrangement of FIG. 6 and FIG. 7.

FIG. 8 is a perspective detail view of the arrangement of the fastening anchor belt 1 and the push bar 37 after the beginning of the setting operation, with a push bar 37 that is advanced in comparison to the arrangement of FIG. 6 and FIG. 7. In this arrangement, the piercing blade 51 is so far advanced that front peripheral cutters 76, 77, which are formed as shank tie cutters at a piercing end 74 of piercing blade 51 and are disposed one on each side of a head cutter 75 located between the shank tie webs 11, 12, 13, 14, and here are offset from each other in the longitudinal direction to make optimum use of the thrust for detachment, are at present in contact with one shank tie web 12 and are just about to be in contact with a shank tie web 14. This movement effecting a detachment operation is brought about by suitable shaping of the control slot 61, the displacement link 36 being freely displaceable in the longitudinal direction by means of the compression spring 35 (not shown in FIG. 8); FIG. 8 shows an intermediate position at the very beginning of the operation of detaching the fastening anchor 4 from the conveyor belt 2, in which the detaching cutters 66 are still spaced apart from the cover plate tie webs 6.

Figure 9:
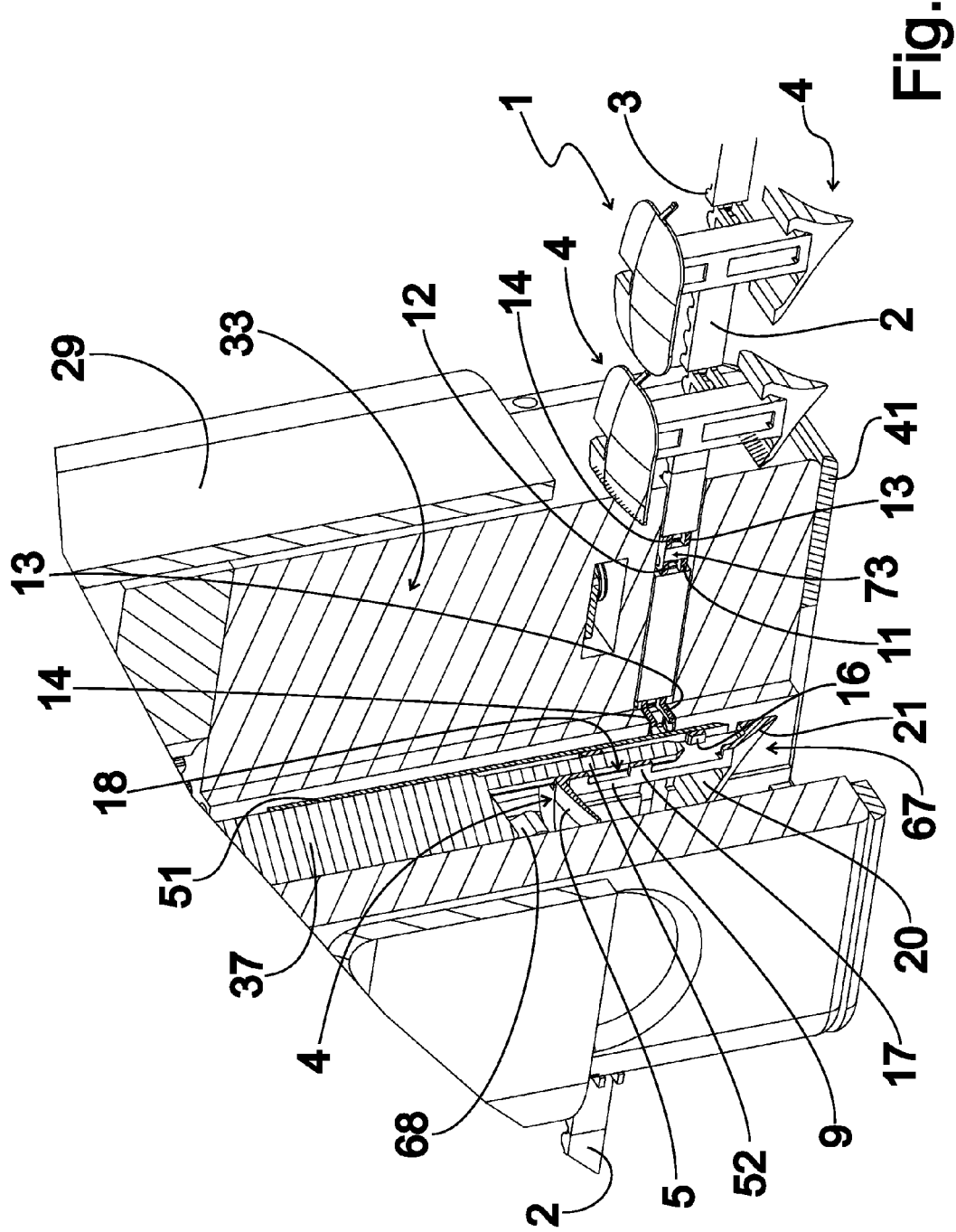
FIG. 9 is a partially cut-away perspective view corresponding to FIG. 7 of the arrangement of FIG. 6 with the push bar advanced.

FIG. 9 shows, in a representation similar to FIG. 7, the push bar 37 in an arrangement in which it is farther advanced than in FIG. 8, and in which the piercing blade 51 has severed all the shank tie webs 11, 12, 13, 14 and the insertion pin 52 has entered the receiving space 18 but is still some distance from the transverse stop 22. The dimensions of the receiving space 18 and of the insertion pin 52 are so adapted here that a certain friction lock exists between the fastening anchor 4 and the insertion pin 52, and holds the fastening anchor 4 securely against the insertion pin 52 firmly enough to prevent dropout.

Figure 10:
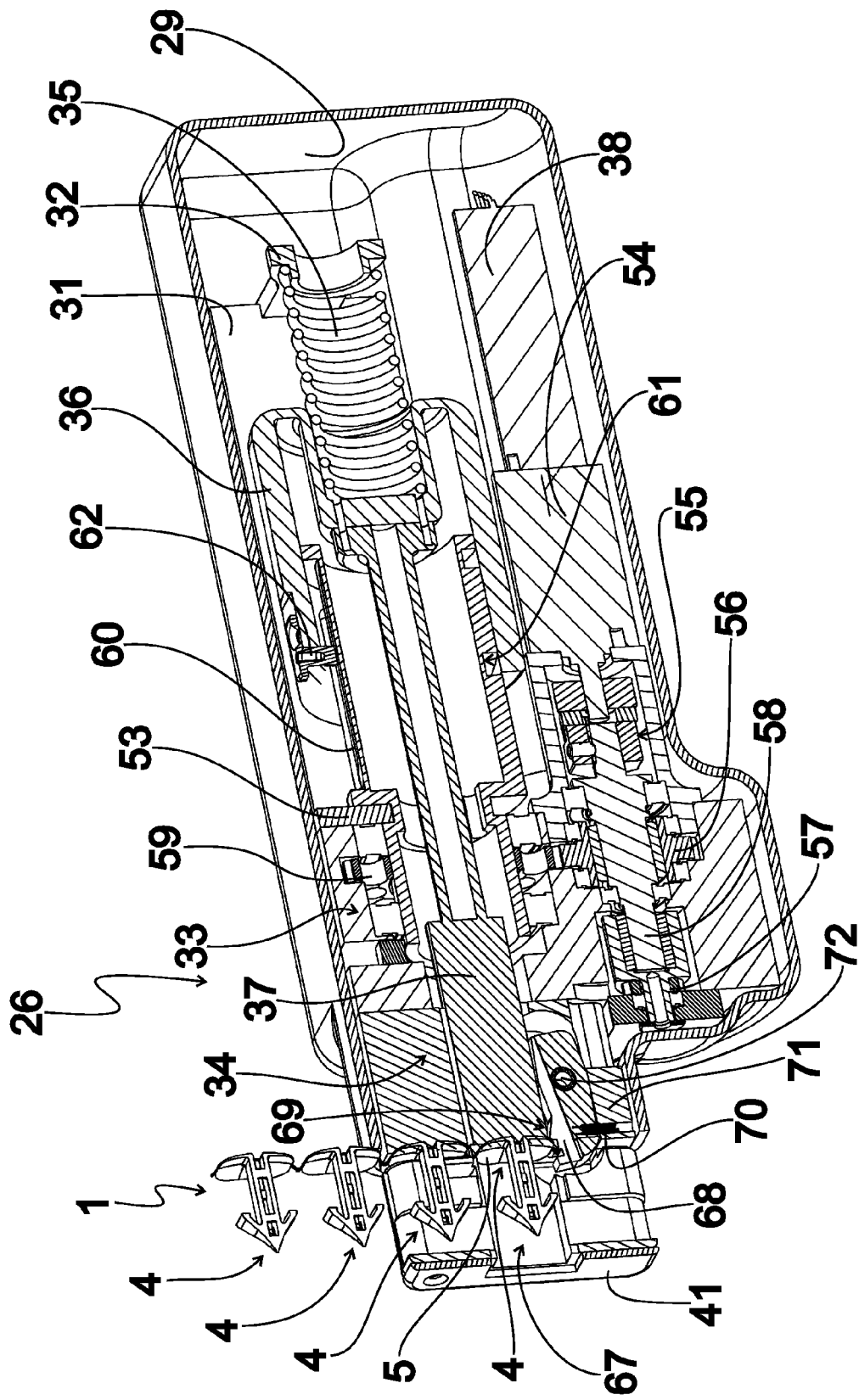
FIG. 10 is a sectional perspective view of the arrangement of FIG. 6 with the push bar in an intermediate position after the detachment of a fastening anchor.

FIG. 10 is a sectional perspective view of the exemplary embodiment of a motor-driven setting tool 26 corresponding to the representation of FIG. 6, with the displacement link 36 in a further intermediate position, in which the push bar 37 bears against the cover plate 5 of the fastening anchor 4 disposed in the discharge conduit 67 and severs the cover plate tie webs 6 via the action of the detaching cutters 66, thus destroying the connection to the fastening anchor 4 next in line for the discharge conduit 67. In this further intermediate position of the push bar 37, the fixing rocker 68 is out of engagement with the cover plate 5, and consequently the fastening anchor 4 located in the discharge conduit 67 and completely detached from the conveyor belt 2 and the adjacent fastening anchor 4 is ready to be applied immediately afterward.

Figure 11:
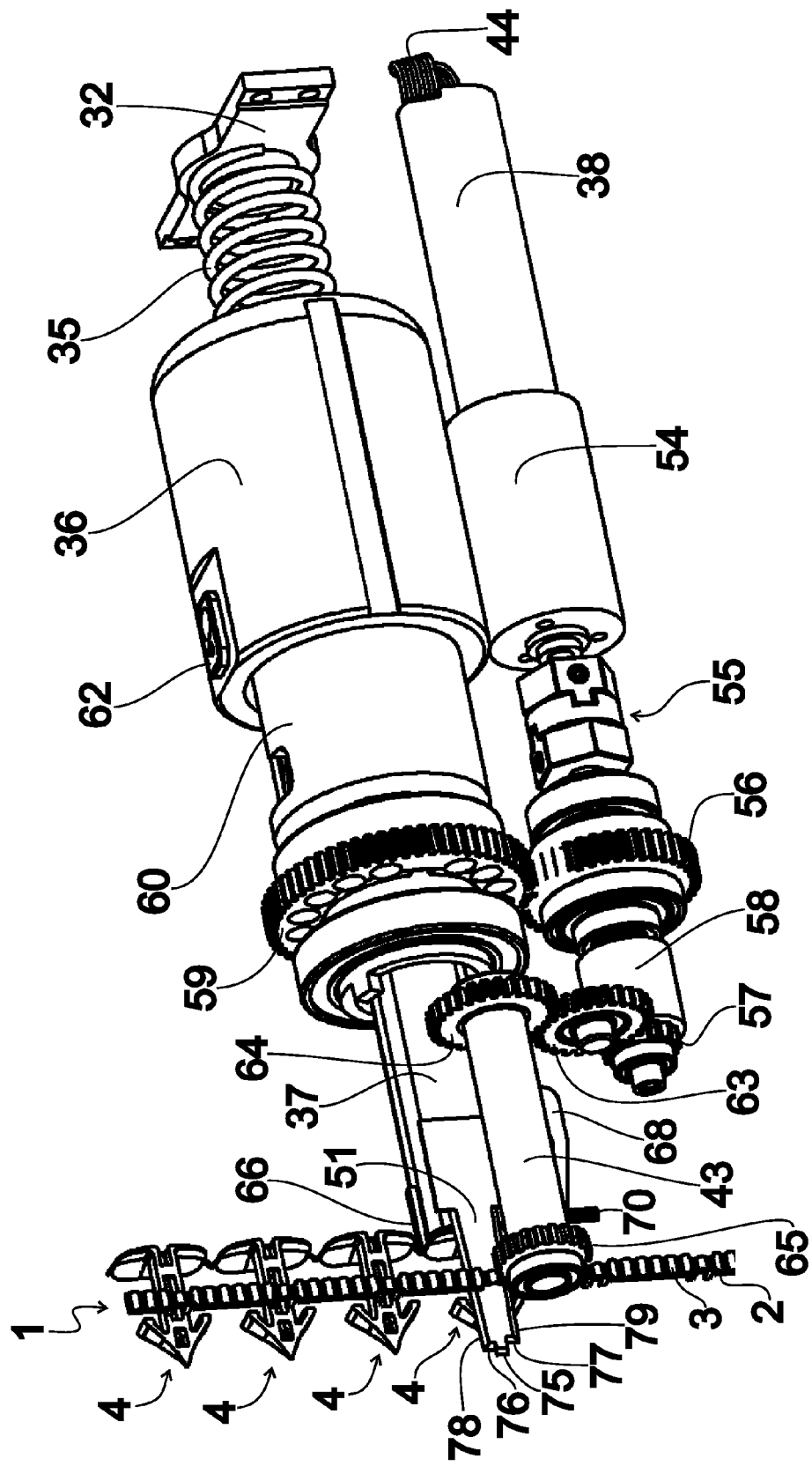
FIG. 11 is a perspective view corresponding to FIG. 5 of the exemplary embodiment of FIG. 3 with a fastening anchor belt after the detachment of a fastening anchor, with the push bar in the aforesaid intermediate position.

FIG. 11 shows the exemplary embodiment of a motor-driven setting tool 26 according to the invention in a representation corresponding to FIG. 5 with the displacement link 36 in the further intermediate position according to FIG. 10. From the representation of FIG. 11, it can be seen that the head cutter 75 and the front peripheral cutters 76, 77 protrude past the tip 21 of the fastening anchor 4 that is ready to be applied, concealed in the representation of FIG. 11, and side cutters 78, 79 adjoining the front peripheral cutters 76, 77 and extending in the longitudinal direction extend by portions laterally outward past the tip 21.

Figure 12:
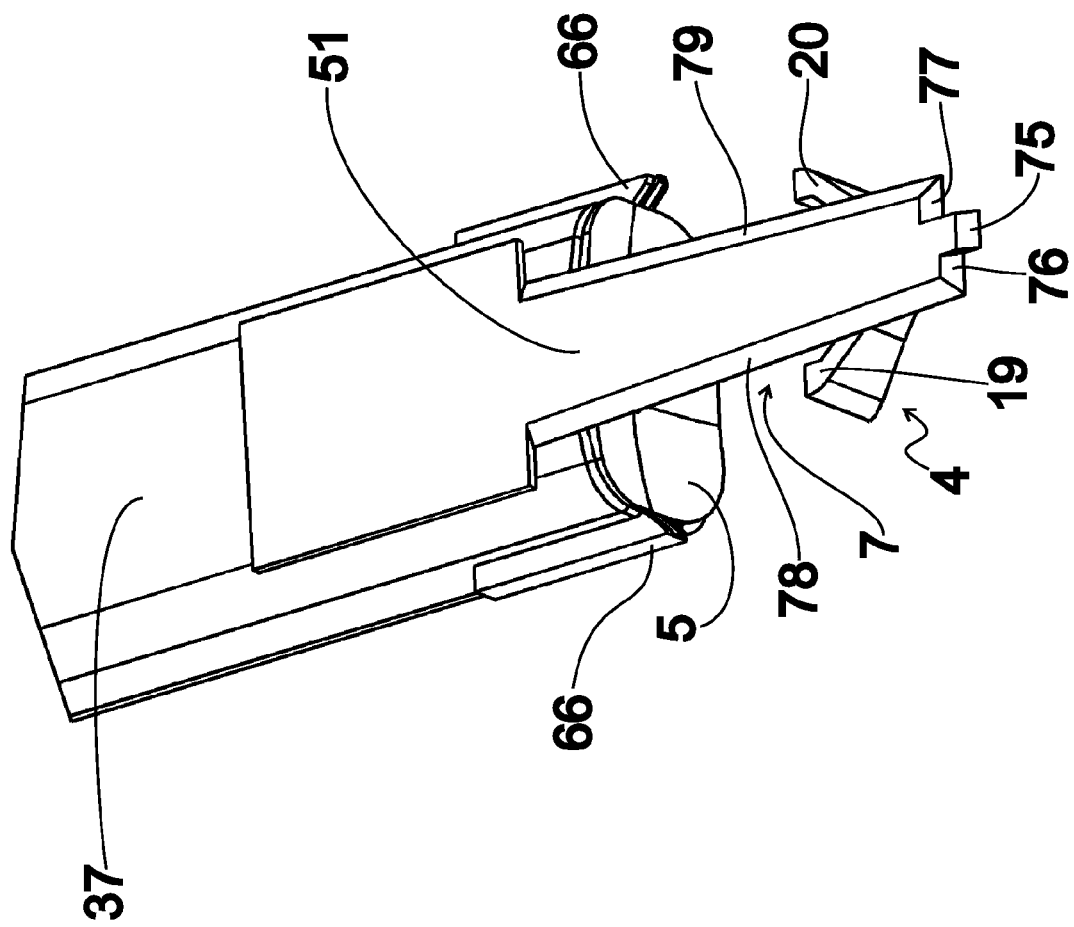
FIG. 12 is a perspective view corresponding to FIG. 8 of the piercing blade in an application position in which it projects beyond a detached fastening anchor.
Figure 13:
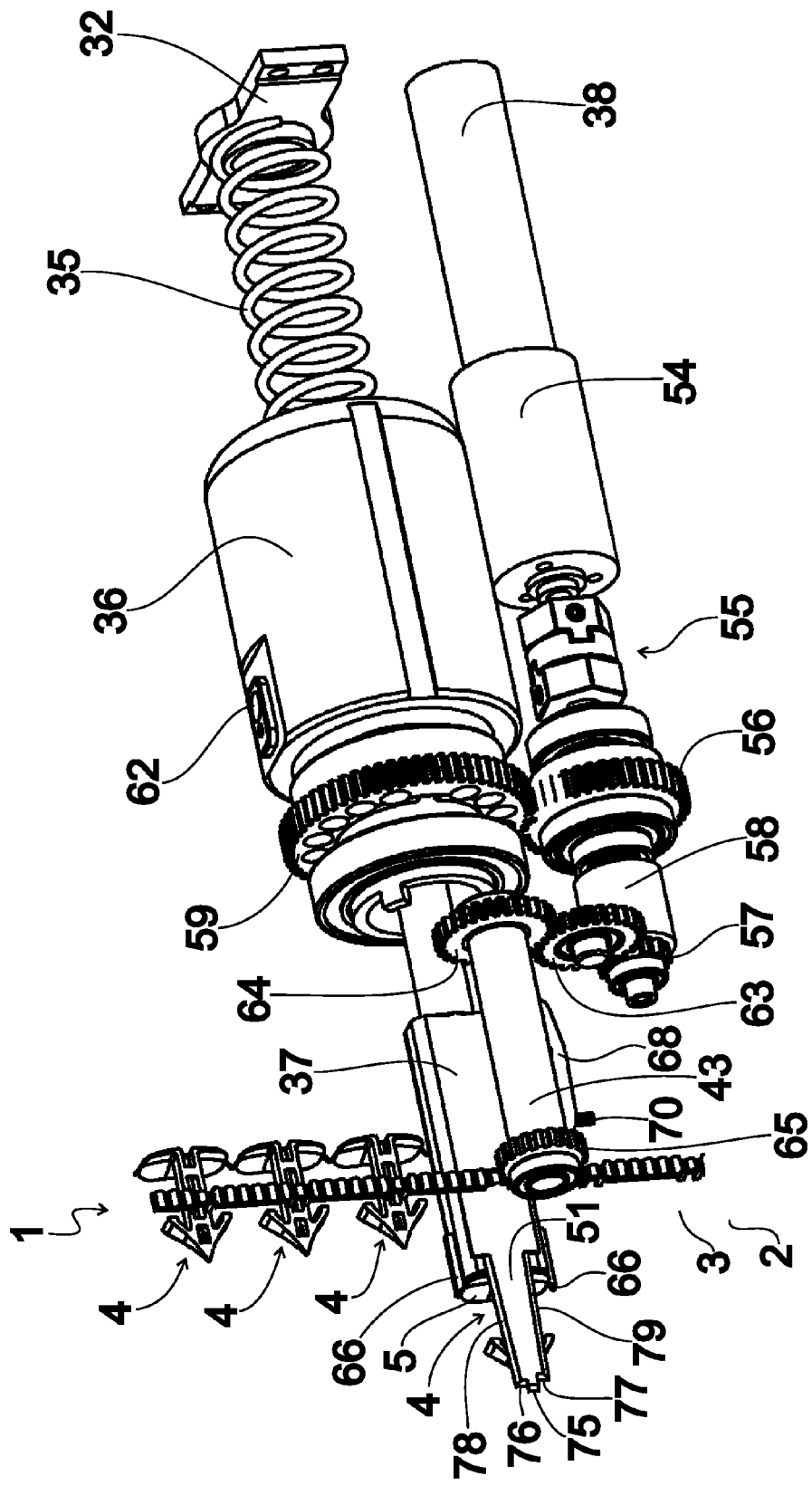
FIG. 13 is a perspective view corresponding to FIG. 11 of the push bar in a maximally advanced position after the application of a fastening anchor.

FIG. 12 is a detail view of the arrangement of the fastening anchor 4 ready to be applied and the piercing blade 51 according to FIG. 11 in an enlarged representation. It is apparent from FIG. 12 that the distance between the side cutters 78, 79 increases from the front peripheral cutters 76, 77 toward the push bar 37, to create a lateral cutting action during the operation of driving in the fastening anchor 4 that will be described in more detail below. FIG. 13, finally, shows the exemplary motor-driven setting tool 26 according to the invention in a representation corresponding to FIG. 11 with the displacement link 36 in an arrangement where it is as far from the abutment plate 32 as it will go and is in abutment against the stop plate 53 (not shown in FIG. 13), in which arrangement the push bar 37, by the same token, is also so far advanced that the fastening anchor 4 that was previously in the discharge conduit 67 is now at a distance from the conveyer belt 2. The setting operation is therefore completed by applying this fastening anchor 4 in a soft, yielding material not illustrated in the representation of FIG. 13.

Alternatively, as a modification, instead of the setting operation taking place via a continuous movement of the displacement link 36, brought about by the spring force of the compression spring 35 and suitable shaping of the control slot 61, from a farthest retracted arrangement, for example according to FIG. 6, to the farthest advanced arrangement, for example according to FIG. 13, said operation takes place via a two-stage movement, in which, in a first movement operation, the displacement link 36 is positively guided by a suitably shaped control slot 61 from the farthest retracted arrangement, for example according to FIG. 6, to a then metastable intermediate position, particularly in accordance with FIG. 11. From this metastable intermediate position, the farthest advanced position of the displacement link 36 is then reached by means of the spring force of the compression spring 35—the displacement link 36 being freely displaceable—as a result of power-controlled unlocking of the trigger button 42 via the force sensor 40.

Figure 14:
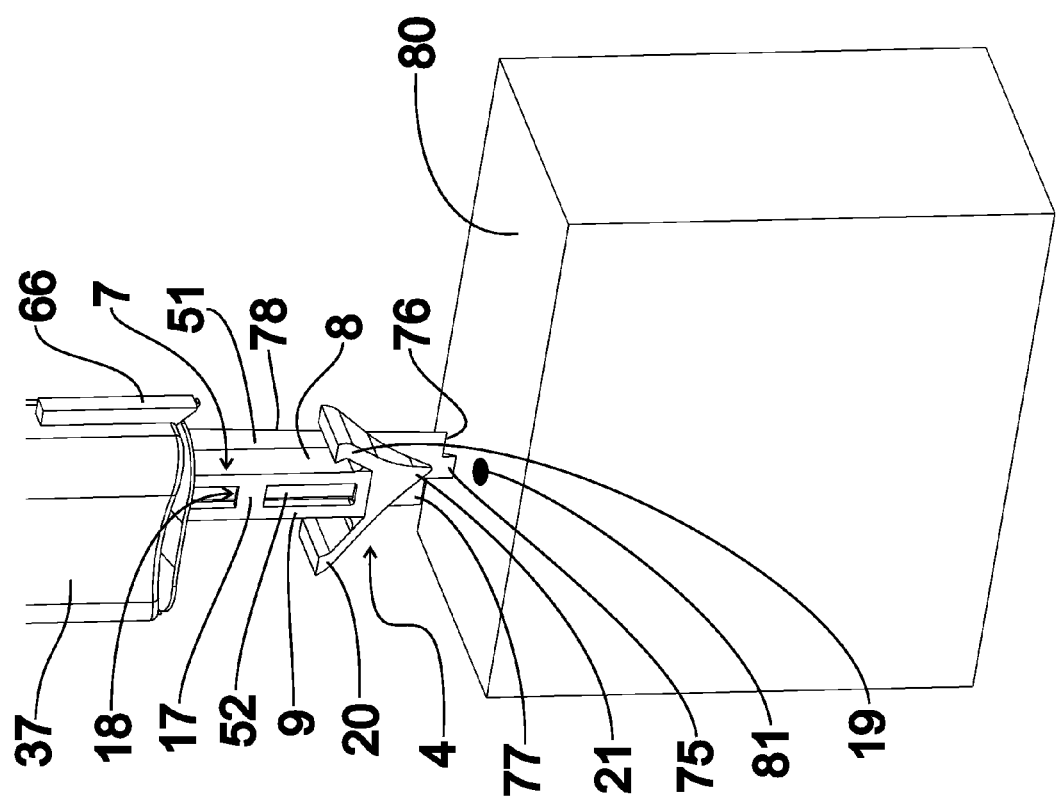
FIG. 14 is a detail view of the push bar and a piercing blade according to the exemplary embodiment of a motor-driven setting tool as depicted in FIG. 3, in a position preceding the application of the fastening anchor in a soft, yielding material.

FIG. 14 is a detail view of the beginning of an application operation in which a fastening anchor 4 detached from the conveyer belt 2 is applied in a soft, yielding material 80 shown as block-like in a part sectional view. In manual installation, the piercing blade 51 is usefully positioned using a laser impingement point 81 as a reference, and the trigger button 42 is actuated after being unlocked once the pressing force is sufficiently high.

Figure 15:
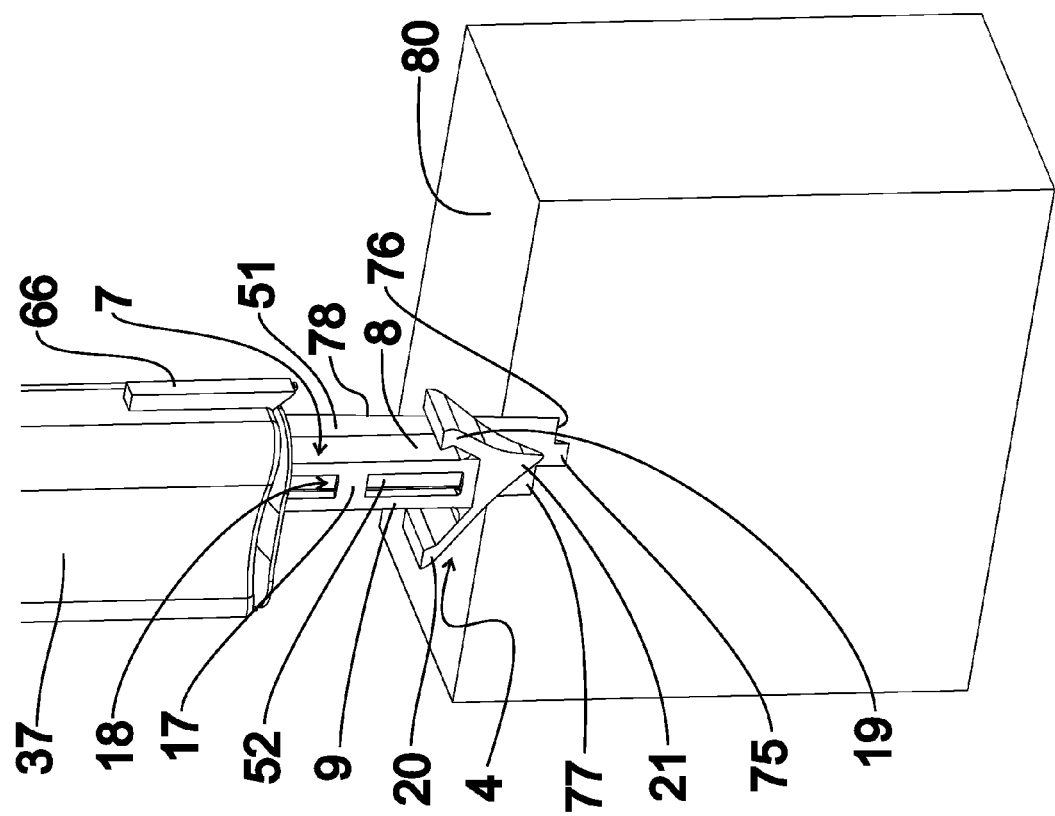
FIG. 15 shows the arrangement of FIG. 14 immediately after the piercing blade and the fastening anchor have been introduced into the soft material.

FIG. 15 shows the arrangement according to FIG. 14 after the actuation of the trigger button 52, with a piercing blade 51 penetrating partway into the soft material 80, creating a weakened area in the material 80 for the tip 21 and the hook cheeks 19, 20 of the fastening anchor 4 under the action of the head cutter 75, the front peripheral cutters 76, 77 and the side cutters 78, 79, thereby reducing the amount of force needed to drive the fastening anchor 4 in.

It may be noted in this connection that the magnitude of the setting force needed to set a fastening anchor 4, which is determined in particular by the geometry of the barb arrangement 10, and the magnitude of the pull-out force of the fastening anchor 4 from a soft material are determined by the relative dimensions of the piercing blade 51 in comparison to the barb arrangement. For instance, both the setting force and the pull-out force decrease with relatively large-dimensioned piercing blades 51, and conversely. Desired values for the setting force and the pull-out force can be set by suitable choice of the relative dimensions.

Figure 16:
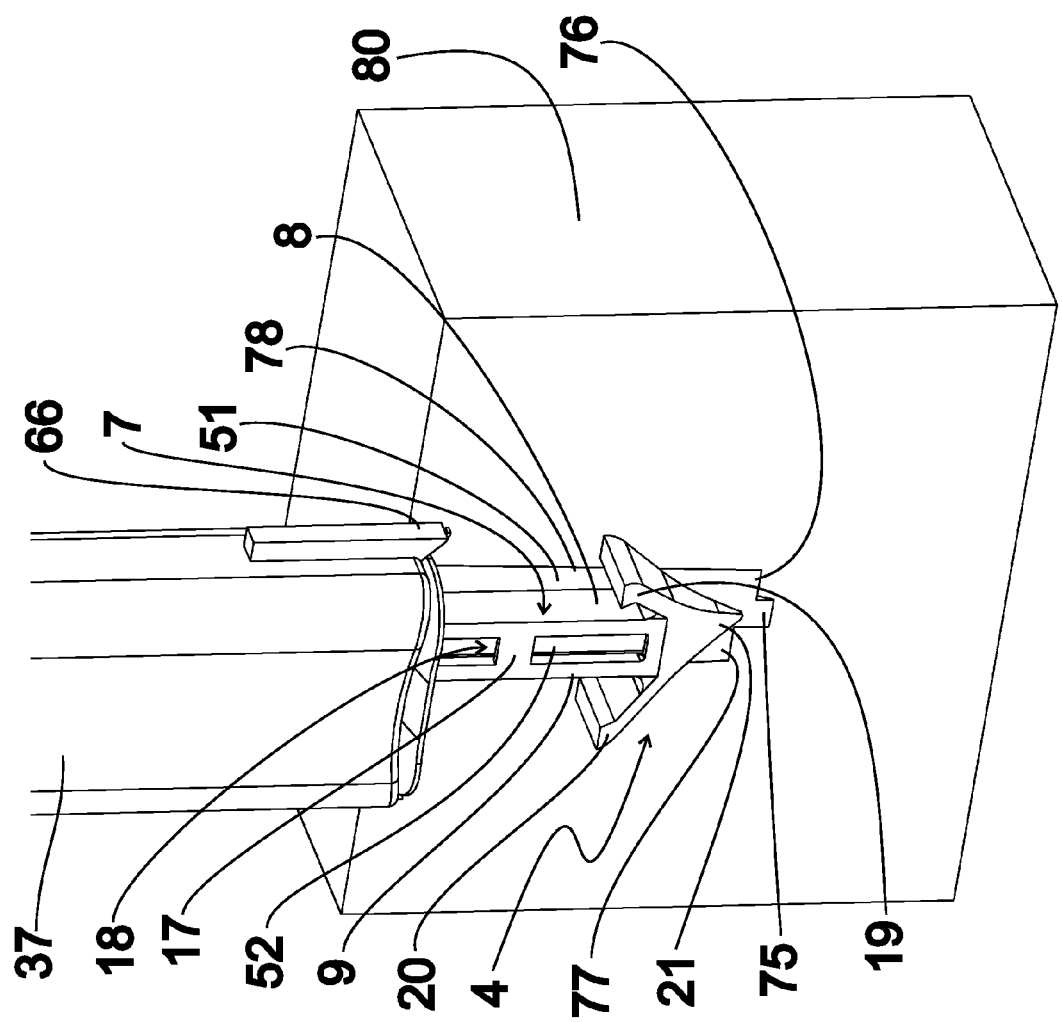
FIG. 16 shows the arrangement of FIG. 14 with the push bar in a maximally advanced position.

FIG. 16 shows the piercing blade 51 driven into the soft material 80 as far as it will go, in which position the barb arrangement 10 and the shank 7 of the fastening anchor 4 are disposed entirely within the soft material 80, while the cover plate 5 rests on the outside of the soft material 80. If the soft material 80 is suitably pressed in with the faceplate 41 beforehand, the fastening anchor 4 can be applied in the soft material 80 with a certain bias.

Figure 17:
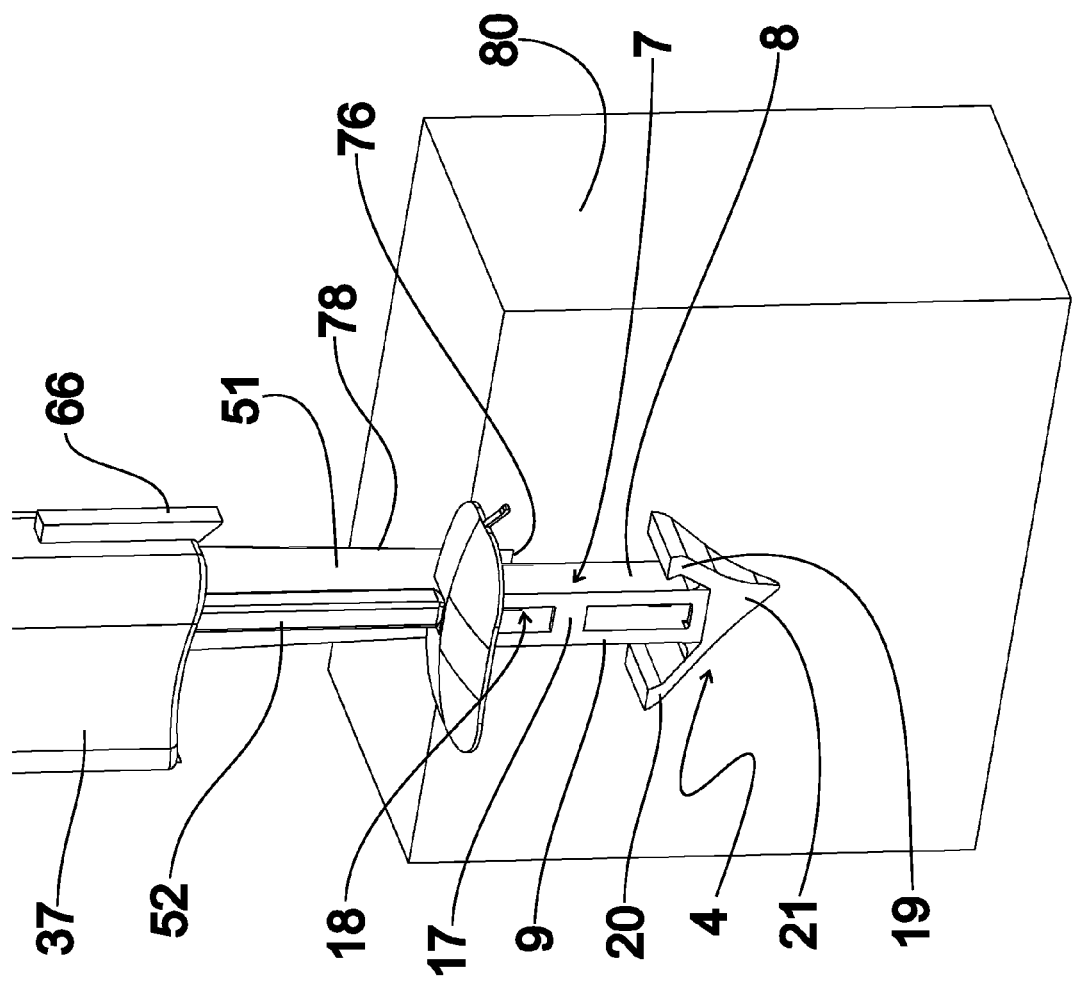
FIG. 17 shows the arrangement of FIG. 14 to FIG. 16 with the fastening anchor applied and a largely retracted piercing blade.

Lastly, FIG. 17 shows the final phase of the setting operation with the fastening anchor 4 applied in the soft material 80 and a piercing blade 51 that is again partially retracted. It should be noted here that the friction force between the insertion pin 52 and the fastening anchor 4 is so adapted that the fastening anchor 4 is held securely against the insertion pin 52, but the forces required to withdraw the insertion pin 52 from the receiving space 18 are not so high as to appreciably compromise the anchoring of the fastening anchor 4 in the soft material 80.

Figure 18:
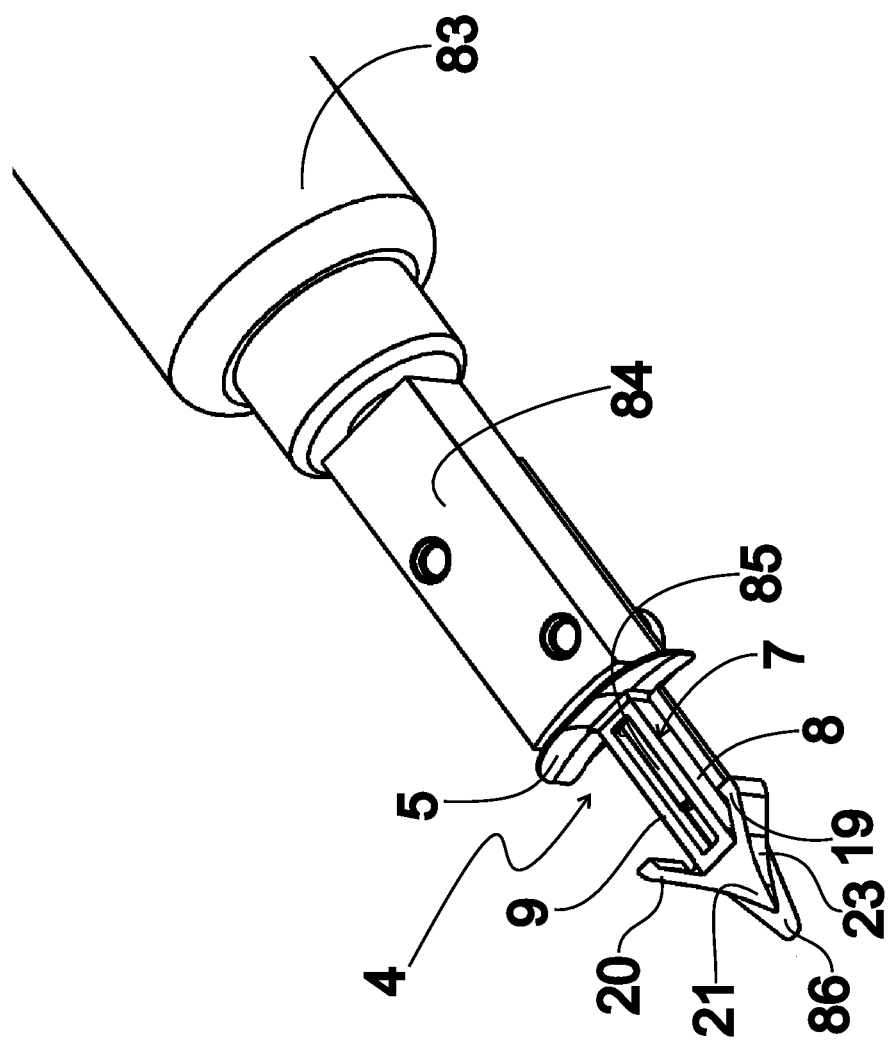
FIG. 18 is a perspective view of another exemplary embodiment of a setting tool according to the invention that can be operated entirely by hand, with a fastening anchor according to the exemplary embodiment of FIG. 2.

FIG. 18 is a perspective view of another exemplary embodiment of a manually operable setting tool 82 according to the invention, which is adapted for use with a single fastening anchor 4 according to the exemplary embodiment described with reference to FIG. 2. The setting tool 82 according to FIG. 18 comprises a handpiece 83, to which an intermediate bar 84 is mounted. Mounted to the rigid intermediate bar 84 is, on the one hand, an insertion pin 85 forming an engaging structure, which is adapted to enter into frictional engagement with the receiving space 18, as in the case of the motor-driven setting tool 26, and a piercing blade 86, which protrudes past the tip 21 of the fastening anchor 4 and presents a sharpened point when the cover plate 5 of the fastening anchor 4 abuts the end of intermediate bar 84 directed away from the handpiece 83. Thus, even with the manually operable setting tool 82 according to the invention, the fastening anchor 4 can be fastened in a soft, yielding material 80 (not shown in FIG. 18) in an application operation of the kind described with reference to FIG. 14 to FIG. 17.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A setting tool in combination with a fastening anchor, said fastening anchor comprising a cover plate, an elongate shank formed on said cover plate and extending away therefrom, a barb arrangement formed on an end of said shank disposed opposite said cover plate, and said shank further comprising a receiving structure including a receiving space extending along a longitudinal direction of said shank and into which an insertion pin of said setting tool can be inserted, said receiving space terminated by a tip forming a cross stop, said receiving space delimited by two mutually facing shank cheeks connected to each other by a plurality of cross struts, said shank cheeks and said cross struts forming said receiving space;

a fastening anchor belt including a plurality of said fastening anchors, wherein each said fastening anchor is mounted to at least one conveyer belt via at least one respective shank tie web formed on a respective shank cheek, said conveyor belt including a tooth structure, said setting tool comprising:

an engaging structure configured as an elongate insertion pin, said insertion pin engageable with said receiving structure of said fastening anchor;

a piercing blade fixedly connected to said insertion pin and including a piercing end projecting beyond said insertion pin in a longitudinal direction, said piercing blade including a shank tie cutter configured to sever each said shank tie web, said piercing blade and said engaging structure mounted to a push bar that is motor-driven to move in said longitudinal direction of said shank; and a feed device for conveying said fastening anchor belt.

2. The setting tool of claim 1, wherein said fastening anchor further comprises at least one cross strut disposed on one long side of said shank cheeks and at least one other cross strut disposed on another long side of said shank cheeks.

3. The setting tool of claim 1, wherein said fastening anchor further comprises a rear engagement recess formed between the end of each said hook cheek and a respective face of said shank cheek, said rear engagement recesses open in a direction facing toward said cover plate.

4. The setting tool of claim 1, wherein said cover plate of each said fastening anchor is connected to a said cover plate of at least one adjacent said fastening anchor via at least one cover plate tie web.

5. The setting tool of claim 4, wherein said setting tool further comprises a detaching cutter configured to sever each said cover plate tie web.

6. The setting tool of claim 5, wherein said detaching cutter is formed on said push bar.

7. The setting tool of claim 1, wherein said piercing blade and said engaging structure are fixedly mounted to a handpiece.

* * * * *